(12) United States Patent
Shearer et al.

(10) Patent No.: US 10,918,008 B2
(45) Date of Patent: Feb. 16, 2021

(54) SYSTEM AND METHOD FOR GENERATING A PRESCRIPTION MAP FOR AN AGRICULTURAL IMPLEMENT BASED ON SOIL COMPACTION

(71) Applicant: CNH Industrial America LLC, New Holland, PA (US)

(72) Inventors: Scott Shearer, Hilliard, OH (US); Andrew Klopfenstein, West Jefferson, OH (US); Brittany Schroeder, Cloverdale, OH (US)

(73) Assignee: CNH Industrial America LLC, New Holland, PA (US)

( * ) Notice: Subject to any disclaimer, the term of this patent is extended or adjusted under 35 U.S.C. 154(b) by 114 days.

(21) Appl. No.: 16/206,240

(22) Filed: Nov. 30, 2018

(65) Prior Publication Data

US 2020/0170174 A1 Jun. 4, 2020

(51) Int. Cl.
*A01B 79/00* (2006.01)
*A01B 63/24* (2006.01)
*A01B 76/00* (2006.01)

(52) U.S. Cl.
CPC ............ *A01B 79/005* (2013.01); *A01B 63/24* (2013.01); *A01B 76/00* (2013.01)

(58) Field of Classification Search
CPC ........ A01B 79/005; A01B 63/24; A01B 76/00
See application file for complete search history.

(56) References Cited

U.S. PATENT DOCUMENTS

| | | | |
|---|---|---|---|
| 6,041,582 | A | 3/2000 | Tiede et al. |
| 6,061,618 | A | 5/2000 | Hale et al. |
| 6,497,153 | B1 | 12/2002 | Hoskinson et al. |
| 6,834,550 | B2 | 12/2004 | Upadhyaya et al. |
| 7,028,554 | B2 | 4/2006 | Adamchuk et al. |
| 7,725,233 | B2 | 5/2010 | Henrickson et al. |
| 8,494,727 | B2 | 7/2013 | Green et al. |
| 8,827,001 | B2 | 9/2014 | Wendte et al. |

(Continued)

OTHER PUBLICATIONS

Behfar et al., Assessment of Soil Compaction Bulk Density Indices and Cone Indices and Cone Index in Different Moistures and Depths for Application in Precise Tillage, World Applied Sciences Journal 20 (12): 1704-1712, 2012 http://pdfs.semanticscholar.org/eb20/acfod9c4fe365f86c1e2b4e8d28e71b84b84.pdf.

*Primary Examiner* — Rodney A Butler
(74) *Attorney, Agent, or Firm* — Rebecca L. Henkel; Rickard K. De Mille

(57) ABSTRACT

A method for controlling a work vehicle towing an agricultural implement across a field during a tillage operation includes receiving one or more soil compaction parameters of the field, the work vehicle, and/or the implement. The method also includes determining one or more soil compaction levels for the field based on the one or more soil compaction parameters. Further, the method includes determining an estimated yield loss for each location in the field based on the one or more soil compaction levels. Moreover, the method includes generating a prescription map for the field based on the estimated yield loss for each location in the field. In addition, the method includes actively adjusting at least one tillage parameter of at least one of the implement or the work vehicle based on the prescription map during the tillage operation to reduce an actual yield loss of the field.

20 Claims, 7 Drawing Sheets

(56) References Cited

U.S. PATENT DOCUMENTS

| | | |
|---|---|---|
| 9,066,465 B2 | 6/2015 | Hendrickson et al. |
| 9,288,938 B2 * | 3/2016 | Cavender-Bares ............ A01C 21/002 |
| 9,511,633 B2 | 12/2016 | Anderson et al. |
| 9,668,399 B2 | 6/2017 | Gates |
| 9,945,832 B2 | 4/2018 | Trobat et al. |
| 2003/0066357 A1 * | 4/2003 | Upadhyaya .......... A01B 79/005 73/818 |
| 2006/0200334 A1 | 9/2006 | Faivre et al. |
| 2007/0208510 A1 | 9/2007 | Anderson et al. |
| 2014/0000919 A1 | 1/2014 | Bachman et al. |
| 2014/0236431 A1 * | 8/2014 | Hendrickson ........ A01B 69/007 701/50 |
| 2018/0257657 A1 * | 9/2018 | Blank .................. G05D 1/0214 |
| 2019/0050948 A1 * | 2/2019 | Perry .................... A01C 21/00 |
| 2019/0110394 A1 * | 4/2019 | VanNahmen ........ A01D 34/006 |

* cited by examiner

SYSTEM AND METHOD FOR GENERATING A PRESCRIPTION MAP FOR AN AGRICULTURAL IMPLEMENT BASED ON SOIL COMPACTION

FIELD

The present subject matter relates generally to agricultural implements and, more particularly, to a system and method for generating a prescription map that includes penetrations depths for an agricultural implement based on soil compaction.

BACKGROUND

A wide range of agricultural implements have been developed and are presently in use for tilling, cultivating, harvesting, and so forth. Tillage implements, for example, are commonly towed behind tractors and may cover wide swaths of ground that include various types of residue. Accordingly, tillers typically include ground-engaging tools, such as shanks and tillage points, configured to condition the soil for improved moisture distribution while reducing soil compaction from such sources as machine traffic, grazing cattle, and standing water. The tillage points are typically replaceable, and various different points may be coupled to the shanks, depending upon the field conditions and the desired results of the tilling operation. Conventional tillage practices include setting a predetermined penetration depth for the ground-engaging tools of the implement and pulling the implement across a field to till the soil.

It is known that soil compaction levels can generate undesirable yield losses if the soil is not properly tilled to reduce the amount of compaction. However, there is currently not an accurate method for estimating yield losses based on soil compaction. As such, current tillage systems are not equipped to optimize the penetration depth of the ground-engaging tools of the tillage implement based on soil compaction in a manner that also minimizes yield loss.

Accordingly, an improved system and method for generating a prescription map that includes penetrations depths for the ground-engaging tools of an agricultural implement that overcomes one or more of the issues in the prior art would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a method for controlling a work vehicle towing an agricultural implement across a field during a tillage operation. The method includes receiving one or more soil compaction parameters of the field, the work vehicle, and/or the implement. The method also includes determining one or more soil compaction levels for the field based on the one or more soil compaction parameters. Further, the method includes determining an estimated yield loss for each location in the field based on the one or more soil compaction levels. Moreover, the method includes generating a prescription map for the field based on the estimated yield loss for each location in the field. In addition, the method includes actively adjusting at least one tillage parameter of at least one of the implement or the work vehicle based on the prescription map during the tillage operation to reduce an actual yield loss of the field.

In one aspect, the present subject matter is directed to a method for generating a prescription map for minimizing yield loss of a field during a tillage operation. The method includes receiving one or more soil compaction parameters of the field, the work vehicle, and/or the implement. Further, the method includes determining one or more soil compaction levels for the field based on the one or more soil compaction parameters. Moreover, the method includes determining an estimated yield loss for each location in the field based on the one or more soil compaction levels. The method also includes generating a prescription map for the field based on the estimated yield loss for each location in the field. In addition, the method includes storing the prescription map into at least one of a vehicle controller of a work vehicle or an implement controller of an implement for use during the tillage operation to minimize an actual yield loss of the field.

In yet another aspect, the present subject matter is directed to a system for controlling a work vehicle towing an agricultural implement across a field during a tillage operation. The system includes at least one controller for controlling a work vehicle and an implement during the tillage operation. The controller includes at least one processor and associated memory. The memory is configured to store instructions that, when implemented by the processor, configure the controller to perform one or more operations, including but not limited to receiving one or more soil compaction parameters of the field, the work vehicle, and/or the implement, determining one or more soil compaction levels for the field based on the one or more soil compaction parameters, determining an estimated yield loss for each location in the field based on the one or more soil compaction levels, generating a prescription map for the field based on the estimated yield loss for each location in the field, and actively adjusting at least one tillage parameter of at least one of the implement or the work vehicle based on the prescription map during the tillage operation to reduce an actual yield loss of the field.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
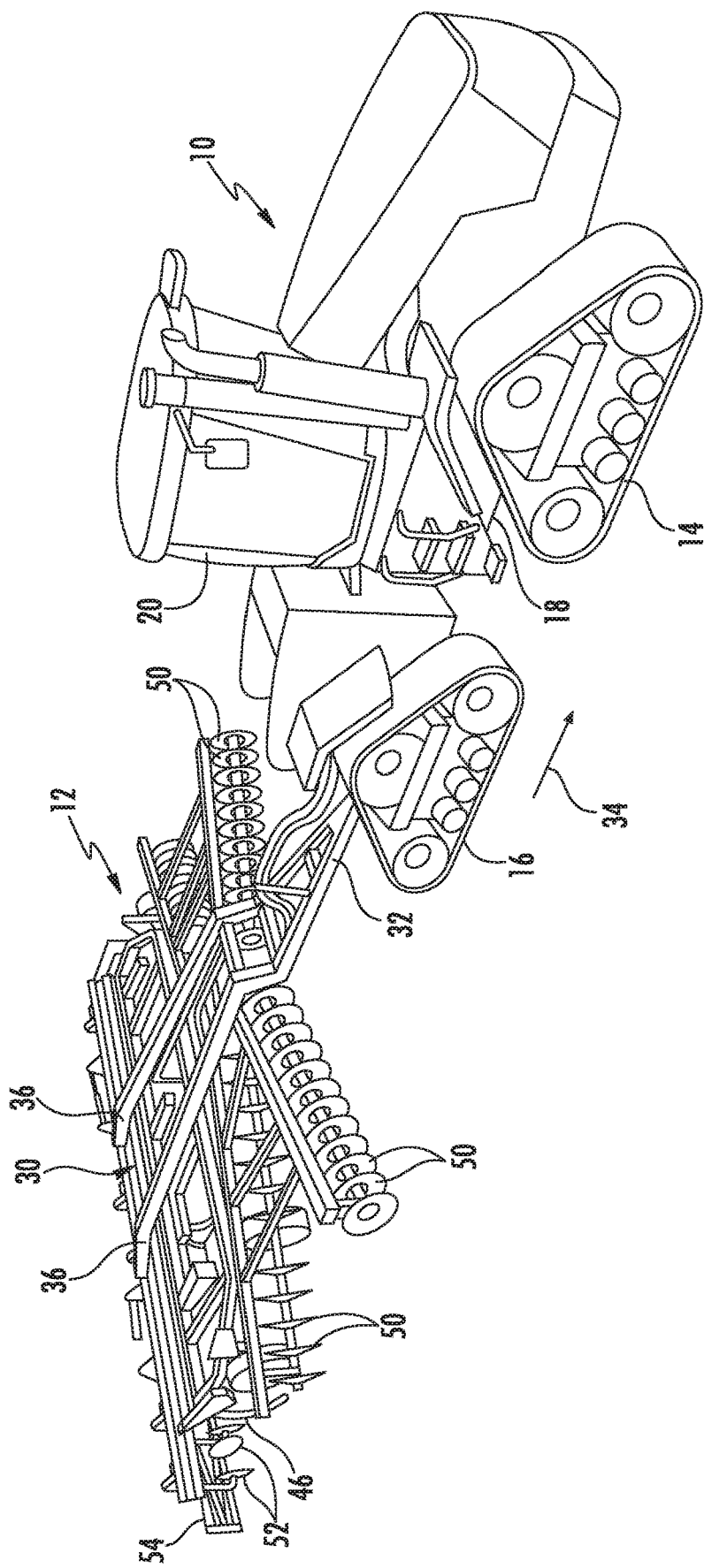
FIG. 1 illustrates a perspective view of one embodiment of a work vehicle towing a tillage implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for generating a prescription map for ground-engaging tools, particularly the shanks, of an agricultural implement being towed by a work vehicle so as to minimize yield loss of a field during a tillage operation. In several embodiments, the prescription map(s) of the present disclosure are generated based on soil compaction values. More specifically, the system considers multiple soil compaction parameters of the field, the work vehicle, and/or the implement and determines soil compaction levels for each location in the field. The system can then determine an estimated yield loss for each location in the field based on the soil compaction levels and generate a prescription map for the field based on the estimated yield loss. Thereafter, the system can automatically adjust the penetration depth(s) of the ground-engaging tools in a manner that minimizes the actual yield loss of the field. For example, the system can automatically downshift or upshift the ground-engaging tools to increase or decrease the penetration depth thereof.

Figure 2:
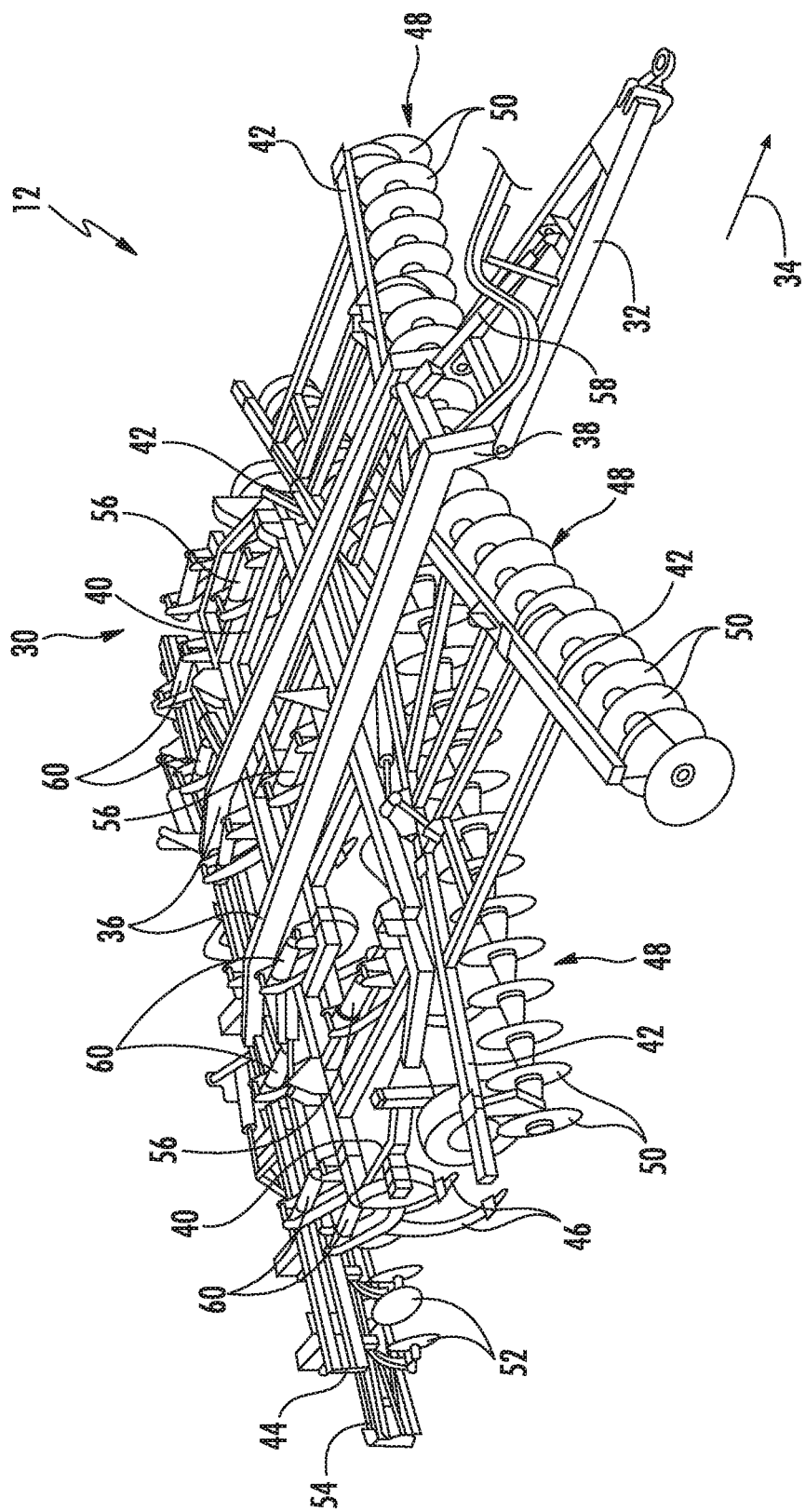
FIG. 2 illustrates a perspective view of the tillage implement shown in FIG. 1.

Referring now to drawings, FIGS. 1 and 2 illustrate perspective views of one embodiment of a work vehicle 10 and an associated agricultural tillage implement 12 in accordance with aspects of the present subject matter. Specifically, FIG. 1 illustrates a perspective view of the work vehicle 10 towing the tillage implement 12 (e.g., across a field). Additionally, FIG. 2 illustrates a perspective view of the tillage implement 12 shown in FIG. 1. As shown in the illustrated embodiment, the work vehicle 10 is configured as an agricultural tractor. However, in other embodiments, the work vehicle 10 may be configured as any other suitable agricultural vehicle.

As particularly shown in FIG. 1, the work vehicle 10 includes a pair of front track assemblies 14, a pair or rear track assemblies 16 and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, as is generally understood, the work vehicle 10 may include an engine 22 (FIG. 3) and a transmission 24 (FIG. 3) mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Additionally, as shown in FIGS. 1 and 2, the tillage implement 12 may generally include a carriage frame assembly 30 configured to be towed by the work vehicle via a pull hitch or tow bar 32 in a travel direction of the vehicle (e.g., as indicated by arrow 34). As is generally understood, the carriage frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field along which the tillage implement 12.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till the soil as the tillage implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

Moreover, similar to the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality closing disks.

In addition, the tillage implement 12 may also include any number of suitable actuators (e.g., hydraulic cylinders) for adjusting the relative positioning, penetration depth, and/or up/down force associated with the various ground-engaging tools 46, 50, 52, 54. For instance, the tillage implement 12 may include one or more first actuators 56 coupled to the central frame 40 for raising or lowering the central frame 40 relative to the ground, thereby allowing the penetration depth and/or the down pressure of the shanks 46 to be adjusted. Similarly, the tillage implement 12 may include one or more second actuators 58 coupled to the disk forward frame 42 to adjust the penetration depth and/or the down pressure of the disk blades 50 (also referred to herein interchangeably as the front disk gangs). Moreover, the tillage implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the down pressure and/or the penetration depth).

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 14, 16.

It should also be appreciated that the configuration of the tillage implement 12 described above and shown in FIGS. 1 and 2 is only provided for exemplary purposes. Thus, it should be appreciated that the present subject matter may be readily adaptable to any manner of tillage implement configuration. For example, as indicated above, each frame section of the tillage implement 12 may be configured to support any suitable type of ground-engaging tools, such as by installing closing disks on the aft frame 44 of the tillage implement 12.

Figure 3:
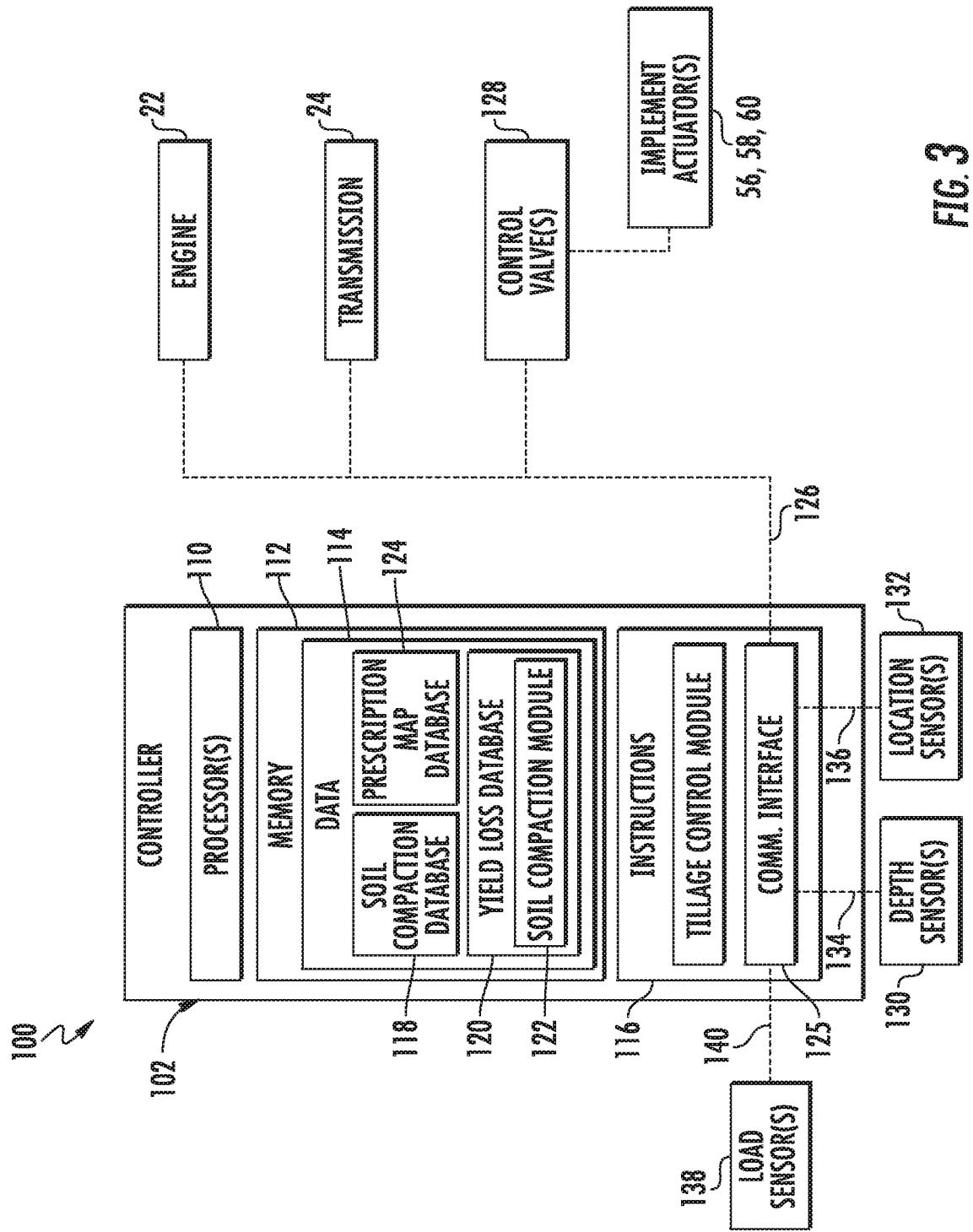
FIG. 3 illustrates a schematic view of one embodiment of a system for controlling a work vehicle towing an agricultural implement across a field during a tillage operation based on a prescription map in accordance with aspects of the present subject matter.

Referring now to FIG. 3, a schematic view of one embodiment of a system 100 for minimizing crop yield loss of the field is illustrated in accordance with aspects of the present subject matter. As used herein, the yield or agricultural output of the field generally refers to the measure of the yield of a crop per unit area of land cultivation and/or the seed generation of the plant itself. In general, the system 100 will be described herein with reference to the work vehicle 10 and the tillage implement 12 described above with reference to FIGS. 1 and 2. However, it should be appreciated that the disclosed system 100 may generally be utilized with work vehicles having any suitable vehicle configuration and/or tillage implements have any suitable implement configuration.

In several embodiments, the system 100 may include a controller 102 and various other components configured to be communicatively coupled to and/or controlled by the controller 102, such as various components of the work vehicle 10 and/or the tillage implement 12. In general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, an Electronic Control Unit (ECU), a programmable logic controller (PLC), an application specific integrated circuit, and other programmable circuits. Additionally, the memory 112 may generally comprise memory element(s) including, but not limited to, computer readable medium (e.g., random access memory (RAM)), a hard disk drive (HDD), a solid-state drive (SSD), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

Figure 4:
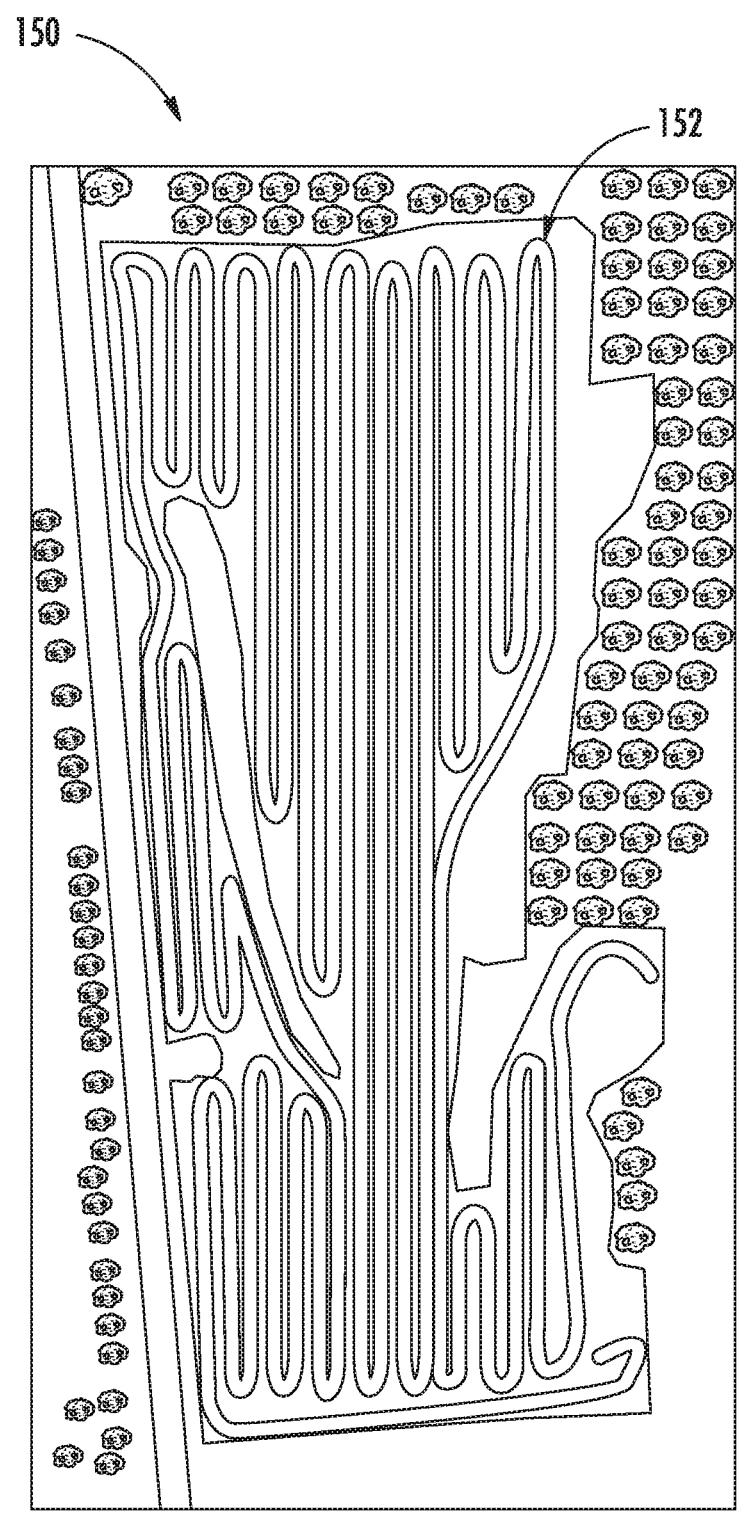
FIG. 4 illustrates a schematic diagram of one embodiment of a field traffic map depicting where a work vehicle has travelled in the field in accordance with aspects of the present subject matter.

In several embodiments, the data 114 may be stored in one or more databases. For example, as shown, the memory 112 may include a soil compaction database 118 for storing information related to soil compaction for the field being tilled. Thus, the soil compaction database 118 is configured to receive and/or store one or more soil compaction parameters of the field, the work vehicle 10, and/or the implement 12. For example, as shown, the soil compaction parameter(s) may include field traffic, the weight of work vehicle or the implement, soil type, soil composition, topsoil depth, subsoil depth, field elevation, tire traction, sensor data from one or more load sensors, and/or any other suitable parameters indicative of soil compaction. In addition, the soil compaction database 118 may be configured to determine one or more soil compaction levels for the field based on the one or more soil compaction parameters. More specifically, as shown in FIG. 4, the controller 102 may be configured to continuously monitor the field traffic 152 of the field 150 via one or more location sensors 132 (FIG. 3). For example, in one embodiment, the location sensor(s) 132 may correspond to Global Positioning System (GPS) sensors. Thus, as shown, one or more communicative links or interfaces 136 (e.g., one or more data buses) may be provided between the communications interface 125 and the location sensor(s) 132 to control the operation of such system components. Further, as shown in FIG. 4, the field traffic 152 described herein may generally correspond to the various paths taken by the work vehicle 10 and/or the implement 12 across the field.

In alternative embodiments, the controller 102 may be configured to determine the soil compaction level(s) via one or more load sensors 138 associated with the ground-engaging tools of the implement 12. More specifically, as shown, one or more communicative links or interfaces 140 (e.g., one or more data buses) may be provided between the communications interface 125 and the load sensor(s) 138 to control the operation of such system components. Thus, in such embodiments, the controller 102 is configured to monitor the load applied on the one or more around-engaging tools during the tillage operation via the load sensor(s) 138 and correlate the load to a soil compaction level. More specifically, in one embodiment, the controller 102 may correlate the load applied to the shanks 46 to the soil compaction levels for the soil based on a bulk soil density of the field.

Thus, the memory 112 may further include a yield loss database 120 that is configured to determine an estimated yield loss for each location in the field based on the one or more soil compaction levels. In such embodiments, the controller 102 may be configured to estimate the yield loss for each location in the field by inputting the various soil compaction levels into a soil compaction model 122 stored in the memory 112. Thus, the soil compaction model 122 may be configured to generate the estimated yield loss for each location in the field. More specifically, in one embodiment, the soil compaction model 122 may be configured to generate the estimated yield loss for each location in the field based on Equation (1) below:

$$Y_{LOSS}=T_{df}S_{tf}[0.2D_{tc}T_{tt}(5-Y_{att})(c_1L_a+c_2)+0.1D_{sc}T_{st}(10-Y_{ast})(c_1L_a+c_2)] \quad \text{Equation (1)}$$

where YLOSS is the yield loss,
$L_a$ is the axle load,
$S_{tf}$ is the soil type factor,
$c_1$ is a first compaction factor,
$c_2$ is a second compaction factor.
$Y_{att}$ is the years after the top soil trafficking event
$Y_{ast}$ is the years after the subsoil trafficking event,
$D_{tc}$ is the subsoil depth compaction factor,
$D_{sc}$ is the topsoil depth compaction factor,
$T_{tt}$ is the topsoil tillage correction factor,
$T_{st}$ is the subsoil tillage correction factor, and
$T_{df}$ is the traction device factor.

Figure 5:
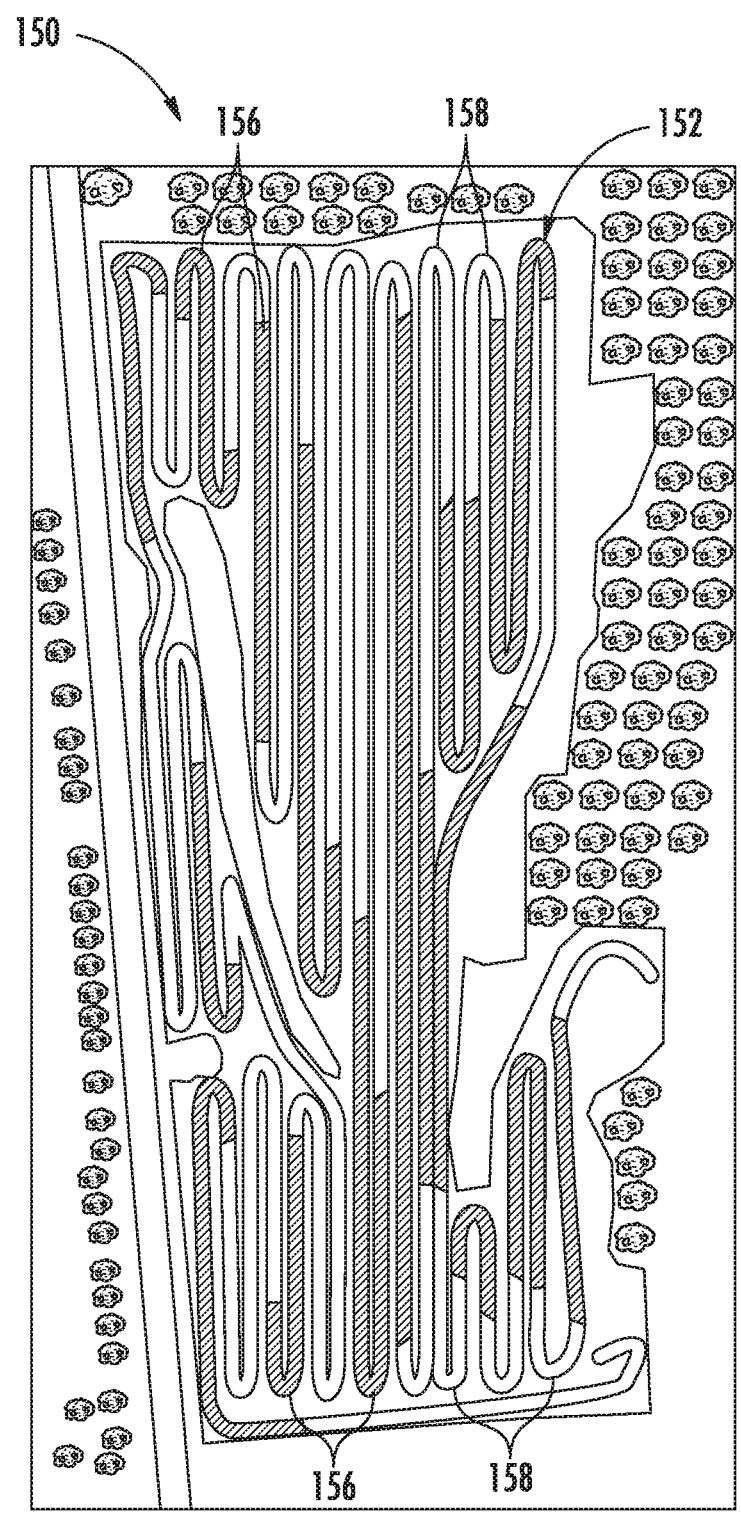
FIG. 5 illustrates a schematic diagram of one embodiment of a prescription map depicting where to till and where not to till in the field in accordance with aspects of the present subject matter.
Figure 6:
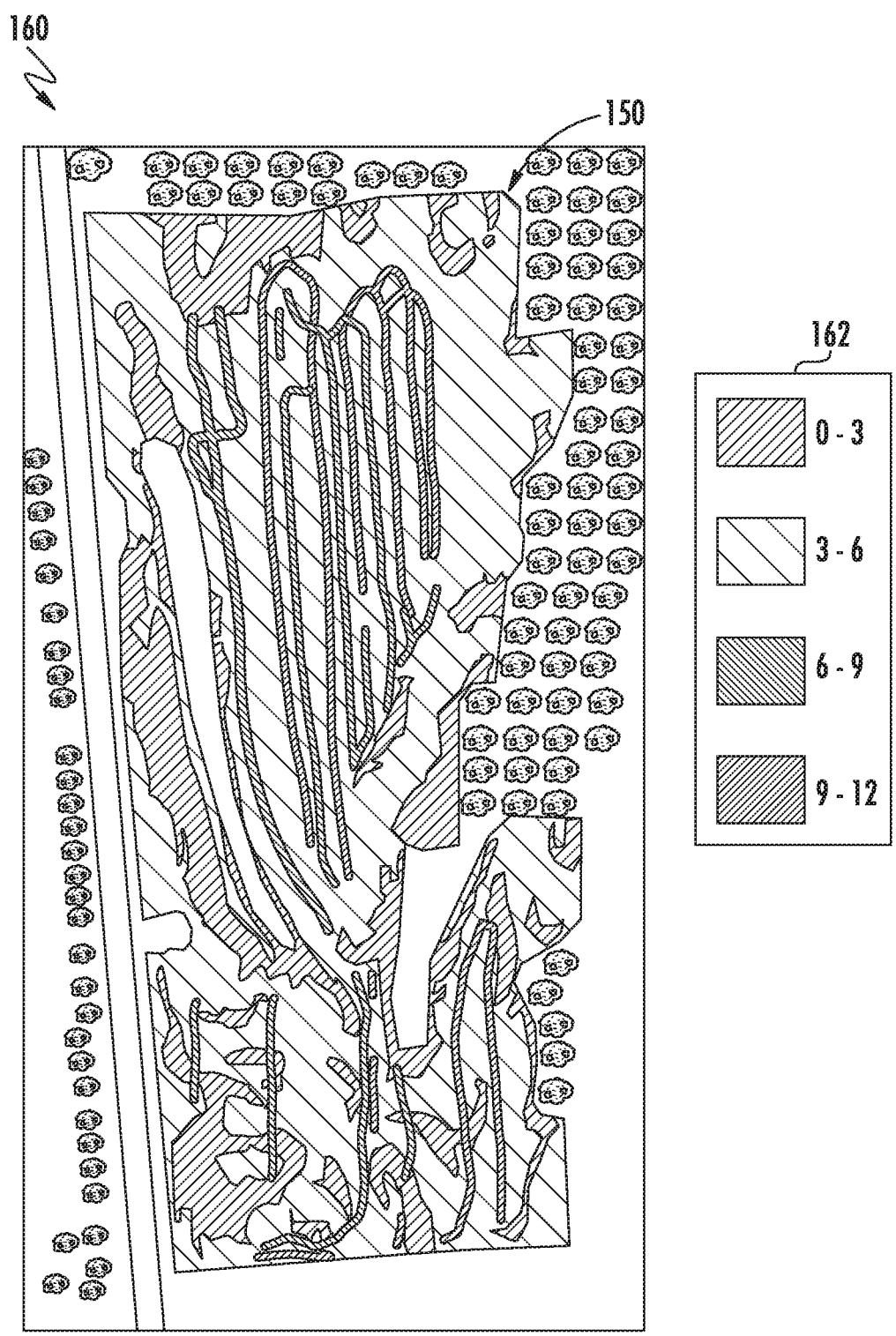
FIG. 6 illustrates a schematic diagram of one embodiment of a prescription map depicting penetration depths of one or more ground-engaging tools at each location in the field in accordance with aspects of the present subject matter.

Referring still to FIG. 3, the memory 112 may also include a prescription map database 124 for generating or updating a prescription map 154 for the field based on the estimated yield loss for each location in the field. Examples of various prescription maps 154, 160 according to the present disclosure are illustrated in FIGS. 5 and 6, respectively. As shown in FIG. 5, the prescription map 154 may simply indicate where to till (as indicated by 156) and where not to till (as indicated by 158). Alternatively, as shown in FIG. 6, the prescription map 160 may include penetration depths 162 of the ground-engaging tools at each location in the field 150. In additional embodiments, the prescription map(s) 154, 160 may be stored within the prescription map database 124 for subsequent processing and/or analysis, e.g. for use during a tillage operation to minimize the yield loss of the field. It should be understood that a "map," as described herein, generally refers to any suitable data structure that correlates two or more data points, such as for example, look-up tables (LUTs), charts, graphs, or a two-dimensional image of the field having data points or areas superimposed onto certain locations in the field (as shown in FIG. 6), and/or similar.

Referring back to FIG. 3, in several embodiments, the instructions 116 stored within the memory 112 of the controller 102 may be executed by the processor(s) 110 to implement a tillage control module 116. In general, the tillage control module 116 may be configured to adjust the operation of the tillage implement 12 by controlling one or more components of the tillage implement 12 and/or the work vehicle 10. Specifically, in several embodiments, the tillage control module 116 may be configured to modify the operation of the tillage implement 12 in a manner designed to minimize the yield loss of the field. Thus, it should be appreciated that the controller 102 may be configured to implement various different control actions to adjust the operation of the tillage implement 12 in a manner that minimizes the crop yield loss of the field according to the prescription map 154, 160. For example, as shown in FIG. 3, the controller 102 may include a communications interface 125 to provide a means for the controller 102 to communicate with any of the various other system components described herein. More specifically, as shown, one or more communicative links or interfaces 126 (e.g., one or more data buses) may be provided between the communications interface 125 and the engine 22, the transmission 24, the control valves 128, and/or the like to allow the controller 102 to control the operation of such system components.

Particularly, in one embodiment, the controller 102 may be configured to actively adjust the tillage parameter of the one or more ground-engaging tools of the implement 12 according to the prescription map 154, 160 to minimize crop yield loss of the field. More specifically, in one embodiment, the controller 102 may be configured to actively adjust the penetration depth and/or a down pressure of the shanks 46 according to the prescription map 154, 160. For example, the controller 102 can automatically downshift or upshift the ground-engaging tools to increase or decrease the penetration depth thereof. Such control also allows the work vehicle 10 to maintain its speed based on an increased load from increased soil compaction levels. In addition, the shanks 46 may be independently actuated from the remaining ground-engaging tools. Thus, as mentioned, the controller 102 may be communicatively coupled to one or more valves 128 configured to regulate the supply of fluid (e.g., hydraulic fluid or air) to one or more corresponding actuators 56 of the shanks 46 of the tillage implement 12. In such an embodiment, by regulating the supply of fluid to the actuator(s) 56, the controller 102 may automatically and independently adjust the penetration depth, the down force, and/or any other suitable tillage parameter associated with the shanks 46 with respect to the remaining ground-engaging tools. It should also be understood that the controller 102 may also be communicatively coupled to one or more valves 128 configured to regulate the supply of fluid (e.g., hydraulic fluid or air) to the remaining actuators 58, 60 of the other ground-engaging tools of the implement 12.

In further embodiments, the system 100 may further include one or more depth sensors 130 communicatively coupled to the controller 102 for monitoring an actual penetration depth of the shanks 46 so as to ensure the controller 102 is accurately following the depths set forth by the prescription map 154, 160. Thus, as shown, one or more communicative links or interfaces 134 (e.g., one or more data buses) may be provided between the communications interface 125 and the depth sensor(s) 130 to control the operation of such system components.

In additional embodiments, the tillage parameter may also correspond to an operational parameter of the work vehicle 10. For example, in one embodiment, the tillage parameter may include the engine speed of the work vehicle 10. For instance, as shown in FIG. 3, the controller 102 may be communicatively coupled to both the engine 22 and the transmission 24 of the work vehicle 10. In such an embodiment, the controller 102 may be configured to adjust the operation of the engine 22 and/or the transmission 24 in a manner that increases, decreases, or maintains the ground speed of the work vehicle 10 and, thus, the ground speed of the tillage implement 12, such as by transmitting suitable control signals for controlling an engine or speed governor (not shown) associated with the engine 22 and/or transmitting suitable control signals for controlling the engagement/disengagement of one or more clutches (not shown) provided in operative association with the transmission 24.

In additional embodiments, tillage parameter may further include the distance of the one or more ground-engaging tools from the ground, a spacing associated with the one or more ground-engaging tools, a point type associated with the one or more ground-engaging tools, an angle of the implement, or another parameter that can be controlled to minimize the yield loss of the field.

Figure 7:
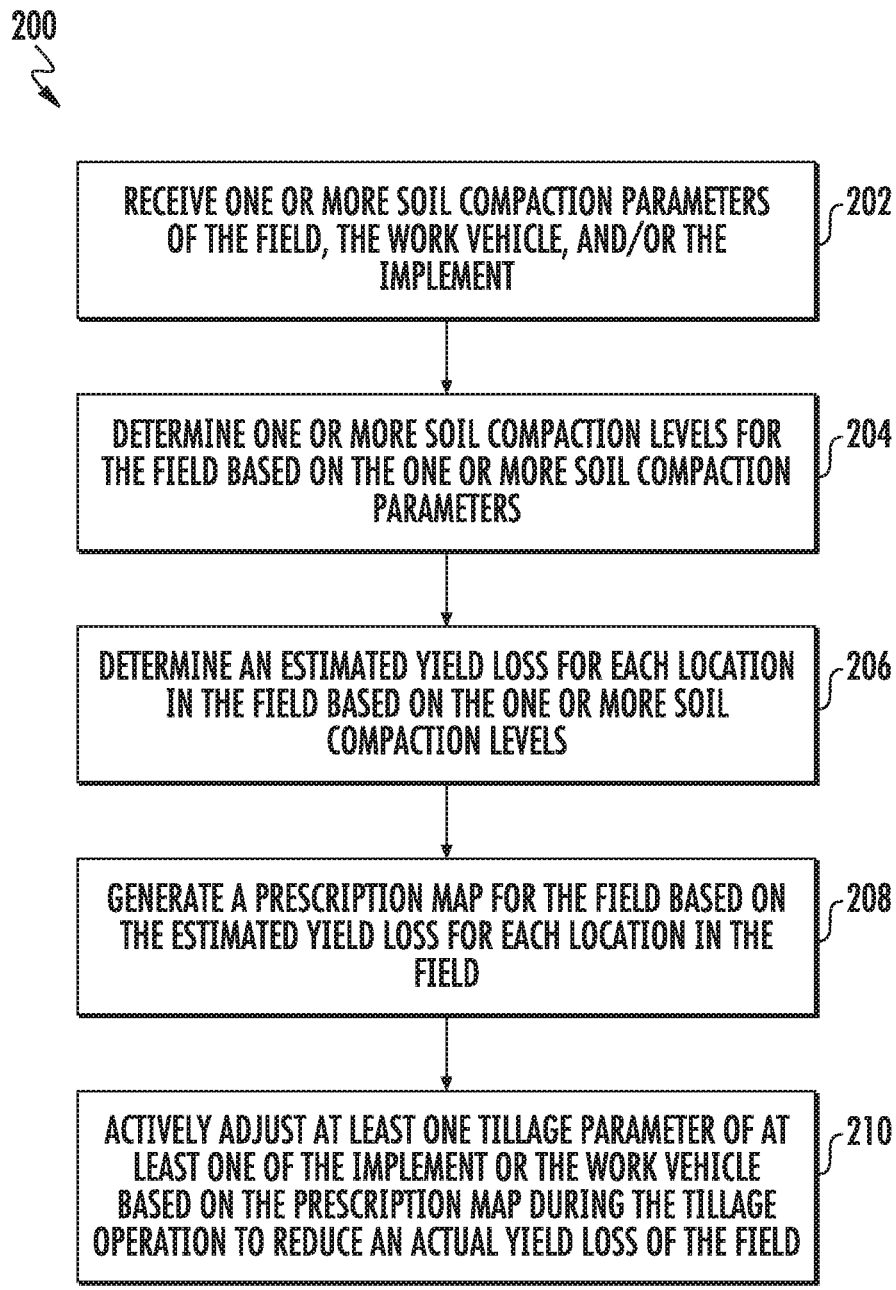
FIG. 7 illustrates a flow diagram of one embodiment of a method for controlling a work vehicle towing an agricultural implement across a field during a tillage operation based on a prescription map in accordance with aspects of the present subject matter.

Referring now to FIG. 7, a flow diagram of one embodiment of a method 200 for controlling a work vehicle towing an agricultural implement across a field during a tillage operation is illustrated in accordance with aspects of the present subject matter. In general, the method 200 will be described herein with reference to the work vehicle 10 and the tillage implement 12 shown in FIGS. 1 and 2, as well as the various system components shown in FIG. 3. However, it should be appreciated that the disclosed method 200 may be implemented with work vehicles and/or tillage implements having any other suitable configurations and/or within systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 may include receiving one or more soil compaction parameters of the field, the work vehicle 10, and/or the implement 12. As shown at (204), the method 200 may include determining one or more soil compaction levels for the field based on the one or more soil compaction parameters. As shown at (206), the method 200 may include determining an estimated yield loss for each location in the field based on the one or more soil compaction levels. As shown at (208), the method 200 may include generating a prescription map 154, 160 for the field based on the estimated yield loss for each location in the field. As shown at (210), the method 200 may include actively adjusting at least one tillage parameter of the implement 12 and/or the work vehicle 10 based on the prescription map 154, 160 during the tillage operation to reduce an actual yield loss of the field.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an agricultural implement during the performance of an agricultural operation within a field, the method comprising:
   accessing, via a computing device, data associated with one or more soil compaction parameters indicative of soil compaction within the field;
   determining, via the computing device, one or more soil compaction levels for the field based on the one or more soil compaction parameters;
   determining, via the computing device, an estimated yield loss at a plurality of different locations across the field based on the one or more soil compaction levels;
   generating, with the computing device, a prescription map for the field based on the estimated yield loss across the field, the prescription map prescribing at least one tillage parameter for a plurality of ground-engaging tools of the agricultural implement at the plurality of different locations across the field; and
   actively adjusting, via the computing device, the at least one tillage parameter for the plurality of ground-engaging tools of the agricultural implement based on the prescription map as the agricultural implement is traversed across the field during the performance of the agricultural operation to reduce an actual yield loss of the field.

2. The method of claim 1, wherein the one or more soil compaction parameters comprise at least one of field traffic, a weight of at least one of the agricultural implement or a work vehicle towing the agricultural implement across the field, soil type, soil composition, topsoil depth, subsoil depth, field elevation, tire traction, or sensor data associated with a load applied to one or more of the plurality of ground-engaging tools during the performance of the agricultural operation.

3. The method of claim 1, wherein determining the one or more soil compaction levels for the field based on the one or more soil compaction parameters comprises:
   accessing location data associated with a location of the agricultural implement within the field
   continuously monitoring field traffic associated with the movement of the agricultural implement across the field during the performance of the agricultural operation; and
   determining the one or more soil compaction levels for the field based at least in part on the field traffic.

4. The method of claim 1, wherein determining the one or more soil compaction levels for the field based on the one or more soil compaction parameters comprises:
   monitoring a load applied to one or more of the plurality of ground-engaging tools during the performance of the agricultural operation; and
   correlating the load applied to the one or more of the plurality of ground-engaging tools to a soil compaction level of the one or more soil compaction levels for the field.

5. The method of claim 1, wherein determining the estimated yield loss at the plurality of different locations across the field based on the one or more soil compaction levels comprises:
   inputting the one or more soil compaction levels into a soil compaction model stored in a memory of the computing device; and
   generating the estimated yield loss for each of the plurality of different locations across field via the soil compaction model.

6. The method of claim 4, wherein correlating the load applied to the one or more of the plurality of ground-engaging tools to the soil compaction level comprises correlating the load to the soil compaction level based on a relationship between the load and a bulk soil density of the field.

7. The method of claim 1, wherein the plurality of ground-engaging tools of the agricultural implement comprise a plurality of shanks supported relative to a frame of the agricultural implement, the plurality of shanks being configured to penetrate into the field during the performance of the agricultural operation.

8. The method of claim 7, wherein the prescription map prescribes penetration depths for the plurality of shanks at the plurality of different locations across the field and wherein actively adjusting the at least one tillage parameter of the plurality of ground-engaging tools based on the prescription map comprises actively adjusting the penetration depths of the plurality of shanks based on the prescription map independent of other ground-engaging tools of the agricultural implement.

9. The method of claim 1, wherein the at least one tillage parameter comprises at least one of a penetration depth for the plurality of ground-engaging tools, a distance of the plurality of ground-engaging tools from the ground, a down pressure associated with the plurality of ground-engaging tools, a spacing associated with the plurality of ground-engaging tools, or a point type associated with the plurality of ground-engaging tools.

10. A method for generating a prescription map for minimizing yield loss of a field during the performance of an agricultural operation, the method comprising:
    accessing, via a computing device, data associated with one or more soil compaction parameters indicative of soil compaction within the field;
    determining, via the computing device, one or more soil compaction levels for the field based on the one or more soil compaction parameters;
    determining, via the computing device, an estimated yield loss at a plurality of different locations across the field based on the one or more soil compaction levels;
    generating, with the computing device, a prescription map for the field based on the estimated yield loss across the field, the prescription map prescribing penetration depths for a plurality of ground-engaging tools of the agricultural implement at the plurality of different locations across the field, the plurality of ground-engaging tools being configured to penetrate into the field during the performance of the agricultural operation; and
    storing the prescription map within memory of at least one of an implement controller of the agricultural implement or a vehicle controller of a work vehicle configured to tow the agricultural implement for use during the agricultural operation to minimize an actual yield loss of the field.

11. A system for performing agricultural operations, the system comprising:
    an agricultural implement including a frame and a plurality of ground-engaging tools supported relative to the frame;
    at least one controller for controlling an operation of the agricultural implement during the performance of an agricultural operation, the at least one controller comprising at least one processor and associated memory, the memory storing instructions that, when implemented by the at least one processor, configure the at least one controller to:
        access data associated with one or more soil compaction parameters indicative of soil compaction within the field;
        determine one or more soil compaction levels for the field based on the one or more soil compaction parameters;
        determine an estimated yield loss at a plurality of different locations across the field based on the one or more soil compaction levels;
        generate a prescription map for the field based on the estimated yield loss across the field, the prescription map prescribing at least one tillage parameter for a plurality of ground-engaging tools of the agricultural implement at the plurality of different locations across the field; and
        actively adjust the at least one tillage parameter for the plurality of ground-engaging tools of the agricultural implement based on the prescription map as the agricultural implement is traversed across the field during the performance of the agricultural operation to reduce an actual yield loss of the field.

12. The system of claim 11, wherein the one or more soil compaction parameters comprise at least one of field traffic, a weight of at least one of the agricultural implement or a work vehicle towing the agricultural implement across the field, soil type, soil composition, topsoil depth, subsoil depth, field elevation, tire traction, or sensor data associated with a load applied to one or more of the plurality of ground-engaging tools during the performance of the agricultural operation.

13. The system of claim 11, wherein the at least one controller is configured to access location data associated with a location of the agricultural implement within the field and continuously monitor field traffic associated with the movement of the agricultural implement across the field during the performance of the agricultural operation, the at least one controller being configured to determine the one or more soil compaction levels for the field based at least in part on the field traffic.

14. The system of claim 13, further comprising one or more location sensors communicatively coupled to the at least one controller, the at least one controller being configured to receive the location data from the one or more location sensors.

15. The system of claim 11, wherein the at least one controller is configured to monitor a load applied to one or more of the plurality of ground-engaging tools during the performance of the agricultural operation and correlate the load applied to the one or more of the plurality of ground-engaging tools to a soil compaction level of the one or more soil compaction levels for the field.

16. The system of claim 11, wherein the at least one controller is configured to determine the estimated yield loss at the plurality of different locations across the field by inputting the one or more soil compaction levels into a soil compaction model stored in a memory of the at least one controller and generating the estimated yield loss for each of the plurality of different locations across field via the soil compaction model.

17. The system of claim 15, wherein the at least one controller is configured to correlate the load applied to the one or more of the plurality of ground-engaging tools to the soil compaction level based on a relationship between the load and a bulk soil density of the field.

18. The system of claim 11, wherein plurality of ground-engaging tools of the agricultural implement comprise a plurality of shanks supported relative to the frame of the agricultural implement, the plurality of shanks being configured to penetrate into the field during the performance of the agricultural operation.

19. The system of claim 18, wherein the prescription map prescribes penetration depths for the plurality of shanks at the plurality of different locations across the field and wherein the at least one controller is configured to actively adjust the at least one tillage parameter for the plurality of ground engaging tools by actively adjusting the penetration depths of the plurality of shanks based on the prescription map independent of other ground-engaging tools of the agricultural implement.

20. The system of claim 11, wherein the at least one tillage parameter comprises at least one of a penetration depth for the plurality of ground-engaging tools, a distance of the plurality of ground-engaging tools from the ground, a down pressure associated with the plurality of ground-engaging tools, a spacing associated with the plurality of ground-engaging tools, or a point type associated with the plurality of ground-engaging tools.

* * * * *